United States Patent Office 3,140,483
Patented July 7, 1964

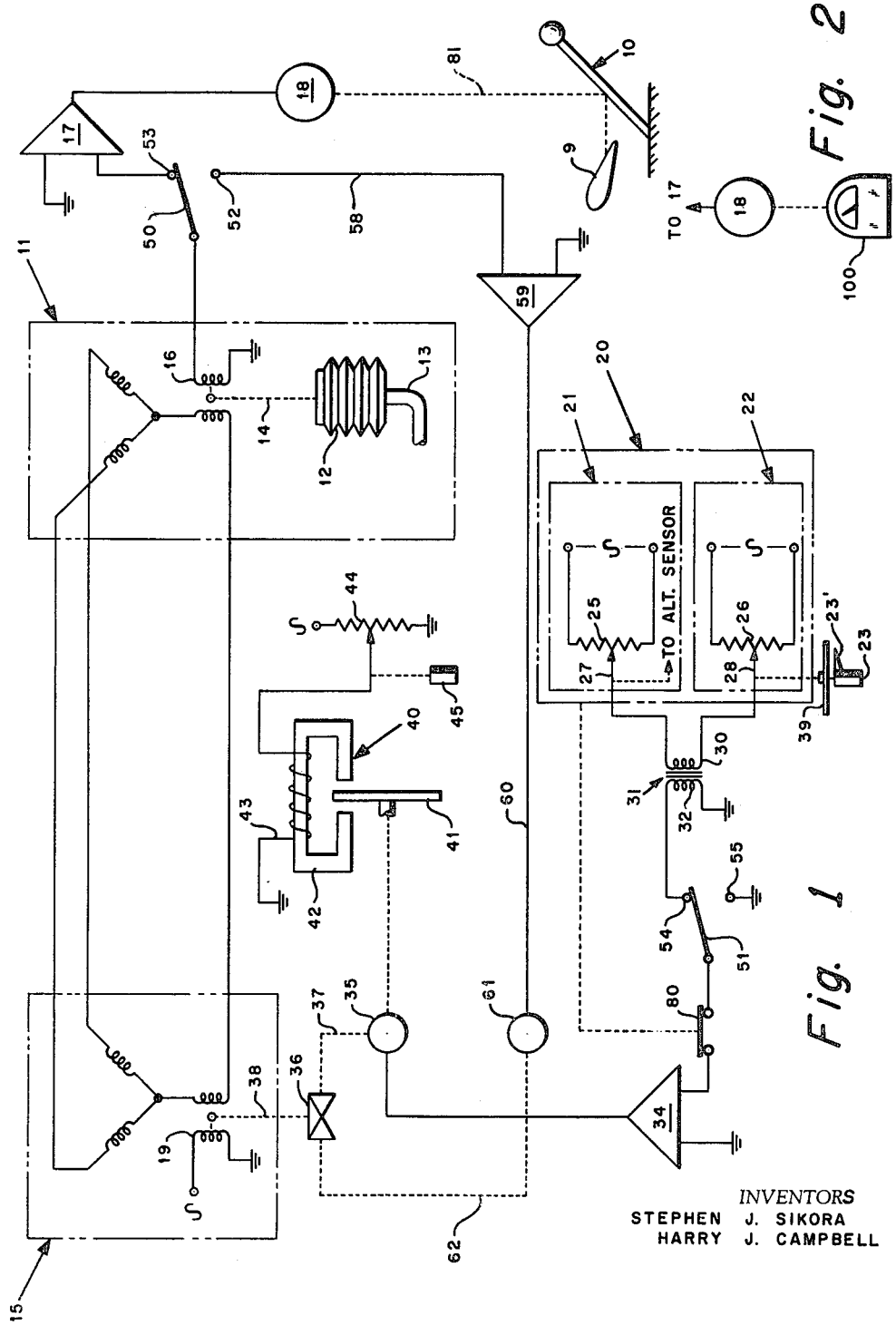

3,140,483
BAROMETRIC-RADAR ALTITUDE CONTROL
SYSTEM
Stephen J. Sikora, Philadelphia, and Harry J. Campbell, Feasterville, Pa., assignors to the United States of America as represented by the Secretary of the Navy
Filed Apr. 3, 1959, Ser. No. 804,052
8 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

The invention relates generally to altitude sensing means suitable for use with automatic steering systems for aircraft or with altimeters.

In the past, altimeters have been based upon two principles. Firstly, the more common type of altimeter is the pressure responsive altimeter which usually includes an aneroid barometer arrangement having expansible bellows means. Secondly, other types of altimeters have been developed based upon the principle of radar which utilizes reflected signals from the surface of the earth. The radar altimeters have means for sensing and measuring the absolute altitude above the earth's surface.

Barometer sensors have several disadvantages in that the actual height above the terrain cannot be detected since only the pressure of atmospheric air, which can be extrapolated for determining the approximately true altitude above seal level, is actually sensed. Thermals, downdrafts, heavy wind conditions, which may occur, for example, in a low pressure area or at high altitudes in a jet stream, seriously affect the accuracy of a pressure altimeter. In contradistinction thereto, the radar sensor when used in altitude control systems especially during low altitude flight, causes the aircraft to follow terrain levels or changes too closely and thereby creates uncomfortable force on the aircraft due to sharp departures from established altitudes. Furthermore, failure in radar signals will cause a radical change in control application in automatically controlled aircraft, such as in the autopilot systems. Also, it is well recognized that sharp banks, dives and climbing attitudes of an aircraft will cause unreliable altimeter signals from a radar unit.

Accordingly, it is contemplated that the combination of barometric and radar altitude sensors be combined so that the advantages of both can be sufficiently utilized, this combination being accomplished in such a manner that the disadvantages of the sensors are neutralized.

One of the principal objects of this invention, therefore, is to provide an altitude sensing arrangement incorporating the advantages of radar and barometric pressure altitude sensing devices in such a manner that the two parameters can be used to modify and serve as a compensator for the other in an automatic pilot for controlling the pitch of an aircraft or other dirigible vehicle, or alternatively can be used to give a direct reading in an altimeter instrument.

A still further object of the invention is the provision of an altitude sensing system having in combination a pressure responsive means and a radar altitude sensing means, the latter having means for comparing a selected altitude with a true altitude above the earth's surface and transmitting an electrical signal representative of the difference thereof and provides a signal to command the altitude control means to change the altitude of the aircraft accordingly, the signal being modified by the pressure altitude sensing means as the airplane changes altitude.

Another object of the invention is the provision of novel barometric-radar altitude sensing means having a rate of climb or descent regulating apparatus for regulating the rate of change of altitude as dictated by the radar altitude sensing unit. The rate of altitude regulating apparatus neutralizes one of the chief disadvantages of a radar altitude sensing unit whereby rapid changes of altitude are dictated by relatively rough terrain to an automatic pilot or causes erratic fluctuation of an altimeter indicator instrument.

A still further object of the invention is the provision of a rate of climb or descent control means in the combination barometric-radar altitude sensing system set forth in the preceding paragraph in which a monitoring rate set arrangement is provided so that the automatically controlled craft can have the altitude changes adjusted smoothly, for example, at rates of 50 to 1000 feet per minute.

Another object of the invention is the provision of the system set forth in the preceding object wherein the altitude rate of change apparatus includes an eddy current brake capable of having the energizing current thereof regulated for regulating the rate at which the radar sensing unit can affect an altitude change in an automatically controlled aircraft or the rate at which a change of altitude is indicated on the altimeter instrument. In this manner transient signals from the radar unit are selectively damped out, the rate being manually selected by the operator. For example, the rate of altitude change can be as low as 50 feet per minute, or as much as 1000 feet per minute up to the maximum rate of climb performance capability of the aircraft.

It is, therefore, a still further object of the invention to provide a combination barometric-radar altitude sensing system as set forth in the preceding paragraphs in which the radar sensing means can be either in effect attenuated or cut out of the system.

A still further object of the invention is the provision of a new and novel altitude control means, preferably for an aircraft, comprising, the combination of barometric and radar altitude sensors, the radar sensor having two potentiometers, one potentiometer being manually set as a reference of the desired or selected altitude and the other potentiometer being a function of true altitude from the radar unit, and wherein the potentiometers are connected as a bridge and provide a signal for adjusting the voltage in a synchro transmitter and a control transformer and thereby commanding the aircraft to change altitude.

Another object is to provide an altitude control means as set forth in the preceding object wherein the signal is a function of the difference in true altitude and the selected altitude and the synchro transmitter is electrically connected back to back with a control transformer.

Another object of the invention is the provision of an altitude control means as set forth hereinabove wherein the barometric altitude sensor positions the rotor of the control transformer and an error signal induced into the rotor coil of the control transformer energizes a servomotor having an output shaft rotation representative of an incremental altitude change per revolution.

The invention further resides in certain novel features of construction, combinations and arrangements of parts, and further objects and advantages of the invention will be apparent to those skilled in the art to which it pertains from the following description of the preferred embodiments thereof described with reference to the accompanying drawing, which forms a part of the specification, and wherein the same reference characters represent corresponding parts throughout the several views, and in which FIG. 1 is a schematic electrical diagram illustrating a preferred embodiment of the invention, the altitude sensor means being preferably connected to aircraft altitude controls; and FIG. 2 shows an alternative embodiment of the invention.

It is to be understood that the invention is not limited to the details of construction and arrangement of parts shown in the drawings and hereinafter described in detail but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, the invention is shown embodied in an automatic pilot for a helicopter only for the purpose of describing and illustrating a preferred embodiment of the invention. The reference numeral 10 indicates generally the schematically illustrated aircraft altitude control collective pitch stick found in a rotary wing type of aircraft. The movement of the collective pitch stick 10 controls altitude control surface means 9 and is governed by information provided from a control transformer or receiver indicated generally by the reference numeral 11. A primary altitude sensor 12 forms a part of the receiver 11 and varies the output thereof with a change in atmospheric pressure. Sensor 12 is essentially a barometric altitude sensing apparatus comprising an aneroid barometer having a bellows, the bellows being inflated or deflated by atmospheric air pressure in a static or atmospheric pressure tube 13.

The movement of the bellows of the barometer 12 adjusts a rotor 14 carrying a pickoff coil 16 which forms an output or secondary of the receiver 11. The receiver 11 has a star-shaped three phase stator winding connected back to back with a similar stator winding forming a part of a synchro transmitter hereinafter referred to as a transmitter, indicated generally by the numeral 15. The reference transmitter 15 has a grounded primary or input coil 19 energized from a rated source of electrical power and provides a means of synchronization and the establishment of a reference so that the rotor of the received 11 can be zeroed.

More particularly, if the signal from the transmitter 15 is maintained constant, altitude changes resulting in a repositioning of the rotor 14 of the primary sensor 12 will produce a cyclic voltage in coil 16 having an amplitude proportional to the product of the cosine of the angle between the two rotors and the amplitude of the voltage in winding 19. The cyclic voltage is fed from the receiver 11 to the servo amplifier 17 which drives the servomotor 18. The servomotor 18 is preferably a two-phase motor mechanically connected to the collective pitch stick 10. A feedback voltage signal proportional to servo position and speed is fed back into the amplifier 17 for nulling the output of the amplifier 17 to limit the travel of the servomotor 18 and thereby stabilize the system in a conventional manner.

A secondary altitude sensing means for transmitting information of altitude changes comprises a radar unit indicated generally by the reference numeral 20, has a pair of interconnected altitude potentiometer units 21, 22 incorporated therein, the unit 21 being a radar altitude reference apparatus for providing true altitude information from the radar altitude sensor, and the unit 22 being a radar altitude selector apparatus into which the command altitude information is supplied. The command altitude selector 22 has an altitude set knob 23 for providing a reference index as to the altitude desired to be attained and/or maintained. The true altitude reference apparatus 21 indicates the true altitude above the earth's surface.

The true altitude reference apparatus 21 and the radar altitude selector apparatus 22 comprise a pair of potentiometers 25 and 26, respectively. Sliders 27, 28 slide on the potentiometers 25, 26, respectively, and are connected together through a transformer primary coil 30. The coil 30 forms the primary side of a transformer 31. A secondary or output coil 32 of the transformer 31 has one end grounded and the other end serves to transmit an electrical signal proportional to an altitude change or differential created by a difference of potential across the potentiometers 25, 26, through the grounded control amplifier 34. The signal drives a reversible control motor 35 and a synchro shaft 37 of the control motor 35 transmits angular motion proportional to altitude change through a mechanical differential 36 to the input or rotor coil 19 of the reference synchro 15 by way of a synchro rotor shaft 38. The adjustment of the reference synchro rotor shaft 38 transmits information to the receiver 11 by way of the three phase, back to back, stator windings and results in an electrical signal being induced into the coil 16. Accordingly, electrical information is transmitted to the servo motor 18 and causes the rotation of the shaft connected to the collective pitch stick 10 and the altitude control surface means 9.

The calibration and operation of the potentiometers 25, 26 in the radar unit 20 is accomplished by positioning the wiper 27 on the potentiometer 25 so as to be representative of the true altitude. The wiper 28 on the potentiometer 26 is then manually positioned so that there is a null in the bridge and no electrical output through the transformer 31. A movable circular disk or dial 39 placed beneath the altitude set knob 23 is rotated so that the pointer 23' of the knob 23 is zeroed on the reference indicator to indicate the true altitude. A repositioning of the altitude set knob 23 will move the pointer 23' away from the true altitude and create a differential signal, proportional to the desired change in altitude. The differential signal is then transmitted through the primary coil 30 of the transformer 31 and, as pointed out, the transmitter 15 is readjusted with the result that a compensating readjustment takes place in the collective pitch stick 10.

In order to control the rate of climb or descent of an aircraft in which the altitude sensing means is being used, an electromagnetic or eddy current drag or brake disk control apparatus, indicated generally by reference numeral 40, is connected to the control motor 35. The drag disk control apparatus comprises an aluminum disk 41 mechanically connected to the output shaft 37 of the motor 35. An electromagnet 42, having a C-shape, is provided with an induction coil 43, grounded at one end and connected at the other end through a potentiometer arrangement 44. The potentiometer 44 has a slider operated by a monitoring rate set knob 45 for enabling the operator to set or establish the rate of rotation of rotor shaft 38. Preferably, the rate of altitude change fed to the rotor coil 19 of the transmitter 15 can be varied from 50 to 1000 feet per minute. The potentiometer 44 is connected in series into an aircraft power supply line, one end of the potentiometer 44 being grounded. The increase of current in the electromagnet 42 creates an increase in drag on the aluminum disk 41.

As hereinbefore pointed out, it is necessary to null, zero, or calibrate the receiver 11 relative to the reference synchro 15 in relatively the same manner that the altitude reference apparatus 21 and the altitude selector apparatus 22 are zeroed or nulled at the bridge connecting the two potentiometers 25 and 26.

In order to calibrate the receiver 11 with the transmitter 15, a switch 50 is moved from a contact 53 to a synchronizing contact 52, and a switch 51 is moved from a contact 54 to a synchronizing contact 55, the synchronizing contact 55 being grounded. In this manner any signal from the pickoff or rotor coil 16 is transmitted through the switch 50, a line 58, a grounded amplifier 59, and a line 60, to the control motor 61 which serves as a synchronizing servomechanism for nulling the transmitter 15 with the receiver 11. A synchro shaft 62 of the synchronizing servo-motor 61 drives the differential 36 which transmits angular motion to the rotor 38 of the transmitter 15. Once the transmitter 15 and the receiver 11 have been balanced or a null is reached and receiver 11 is calibrated to the true altitude, the switches 50 and 51 are moved back to contacts 53 and 54, respectively. This repositioning of the switch 50 again puts the pickoff coil 16 in circuit with the servo amplifier 17. Also, coil 32, forming the secondary of the transformer 31 is again put in circuit with the amplifier 34, it being necessary that the radar unit 20 be disconnected from the receiver 11 so that the cailbration of the latter can be accomplished.

Due to the characteristic unreliability of conventional radar unit means, such as the radar altitude sensor 20, during steep climbs, diving, or banking of the aircraft the apparatus of FIG. 1 is provided with means, not shown, for automatically and/or manually opening a switch 80 and thereby putting the radar unit 20 out of circuit. Most radar units have a "reliability relay" built into the system and it is only necessary to add the contact or switch 80 to the relay. The "reliability relay" is necessary because the signals transmitted by the radar may not be transmitted normally or perpendicularly to the surface of the earth. This results in erratic altitude differential signals being transmitted through the transformer 31 and causing the transmitter 15 to adjust for altitude changes that have not actually occurred. The switch 80 is preferably disposed between the switch 51 and the amplifier 34 in FIG. 1.

When the pilot selects an altitude by turning knob 23, motor 35 is energized and causes rotor 38 to rotate at a very slow rate. This results in a resultant output signal on coil 16 representing the angular difference between rotors 38 and 14. This signal drives motor 18 through amplifier 17 to change the position of collective pitch stick 10. As soon as the aircraft begins to change altitude, the barometric pressure change causes rotor 14 to rotate and follow rotor 38. When the speed of rotation of rotor 14 becomes equal to that of rotor 38, the desired rate of change of altitude is established and shaft 81 is positioned. However, the actual angular displacement of rotor 14 with respect to that of rotor 38 is fixed and remains so until the aircraft attains the selected altitude. A conventional external feedback loop between motor 18 and amplifier 17 is necessary to assure that shaft 81 stops at the required position. This is so because the signal then present in coil 16 due to the angular displacement between rotors 38 and 14 would without feedback cause shaft 81 and rudder 9 to continue movement.

On attaining the selected altitude rotor 38 stops rotating. Rotor 14 stops rotating when the angular difference between the rotors becomes zero and pitch stick 10 is returned to its normal position to cause the aircraft to fly at the selected or new reference altitude.

One of the principal advantages of the combined barometric radar altitude sensing system shown in FIG. 1 is that the differential output from the radar unit 20 compensates or modifies the signal from the barometer 12. Conversely, a signal from the aneroid barometer 12 can modify a signal from the radar unit 20. Should the signals from the radar unit 20 become unreliable, the radar unit 20 can be automatically cut out by the opening of the contact 80 of the "reliability relay" as pointed out.

Also, an operator of an aircraft can select an altitude with the altitude set knob 23 and can also control the rate of climb and descent of the aircraft by setting the monitoring rate set knob 45. The radar sensing means is more sensitive than the barometric means 12 and accordingly the altitude select control and the monitoring rate set control are directly connected thereto.

As shown in FIG. 2, the shaft 81 of the servomotor 18 can be connected to a gear train mechanism so that the altitude change can be read directly on an altimeter gage 100 mounted in an aircraft. It is understood that the rotation of the shaft 81 of the servomotor 18 can be calibrated with the aneroid barometer 12 so that an accurate calibration of the instrument is obtained and the altitude can be read directly by the pilot. It is understood that either or both of the embodiments shown in FIGS. 1 and 2 can be incorporated into a single craft.

Although it is understood that the combined barometric radar altitude radar sensing system is preferably to be used in aircraft and more particularly to be used in conjunction with an automatic pilot in an aircraft, it is also contemplated that the invention can be used in other types of craft.

It is the intention to hereby cover not only the above mentioned modifications of the preferred construction shown, but it is the intention to cover all adaptations, modifications, and uses thereof which come within the practice of those skilled in the art to which the invention relates, and the scope of the appended claims.

What is claimed is:

1. Apparatus of the character described comprising, synchro receiver means, a barometric altimeter providing a pressure altitude change signal to said synchro receiver means, radar altimeter means including a potentiometer driven thereby providing a terrain clearance voltage signal representative of deviation from a preselected altitude, and transmitter means transmitting said terrain clearance voltage signal to said receiver means in opposition to said pressure altitude signal to provide an error signal output.

2. Apparatus as set forth in claim 1, wherein said transmitter means and said receiver means each comprises a stator winding and a rotor carrying a rotor winding, and said stator windings of said transmitter means and said receiver means are connected back to back.

3. Apparatus as set forth in claim 1, wherein said transmitter means and said receiver means each have a rotor, and said terrain clearance signal and said pressure altitude change signal respectively being applied to said transmitter rotor and said receiver rotor.

4. Apparatus as set forth in claim 3, further comprising, engageable calibrating means for zeroing said barometric altimeter by converting said error signal into shaft rotation proportional thereto and angularly adjusting said transmitter rotor a proportionate amount and accordingly nulling said error signal output of said receiver means.

5. A barometric-radar altitude control system for rotary-winged aircraft having an altitude control surface and comprising, a servo motor means for manipulating the control surface, first amplifier means having an output connected to said servo motor means, synchro transmitter means having a stator winding and rotor carrying a grounded input winding, synchro receiver means having a stator winding connected back to back with said transmitter stator winding and having a rotor carrying a grounded error signal pickoff coil connected to the input side of said amplifier means, pressure altitude sensing means connected to said rotor of said receiver means for rotating the same in accordance with the barometrically sensed altitude, and means drivingly connected to said transmitter rotor for rotating the same to cause a signal to appear in said signal pickoff coil which is proportional to the angular displacement between said transmitter and receiver rotors.

6. A barometric-radar altitude control system as set forth in claim 5, wherein said transmitter rotor drive means comprise, command altitude potentiometer means having a wiper adapted to be positioned according to a desired command altitude for picking off a voltage signal proportional to the command altitude, radar means including terrain clearance potentiometer means having a wiper adapted to be positioned to pick off a voltage signal proportinal to the terrain clearance of the aircraft, transformer means having a primary winding forming a bridge electrically connected across said wipers of said potentiometer means and having a grounded secondary winding, second amplifier means having said secondary winding electrically connected to the input side thereof for driving the same, a first synchronous motor means connected to the output side of said second amplifier means and having drive shaft means driving said transmitter rotor, said first synchronous motor means driving said transmitter rotor to an angular position proportional to an error signal which is the voltage difference between said command voltage signal and said terrain clearance voltage signal, and said pressure altitude sensing means driving said synchro receiver means rotor to a position proportional to the sensed pressure altitude.

7. A barometric-radar altitude control system as set forth in claim 6, further comprising synchronization means for calibrating said synchro receiver means, third amplifier means having the input side thereof adapted to be selectably connected to said receiver pickoff coil, second synchronous motor means electrically connected to the output side of said second amplifier means, mechanical differential means in said drive shaft means, said first and second synchronous motor means forming the inputs to said mechanical differential means, the output of said mechanical differential means driving said transmitter rotor.

8. A barometric-radar altitude control system as set forth in claim 6, further comprising, eddy current brake means connected to said drive shaft means for controlling the turning rate of the same and thereby controlling the rate of aircraft altitude change by controlling the rate that said error signal is fed to said transmitter means and thence to said receiver means, and means for controlling said eddy current brake and thereby controlling the rate of altitude change of the aircraft.

References Cited in the file of this patent

UNITED STATES PATENTS

| | | |
|---|---|---|
| 2,678,178 | MacCallum | May 11, 1954 |
| 2,729,814 | Wimberly | Jan. 3, 1956 |
| 2,809,340 | Bernhart | Oct. 8, 1957 |
| 2,896,145 | Snodgrass | July 21, 1959 |
| 2,930,035 | Altekruse | Mar. 22, 1960 |

OTHER REFERENCES

"Feedback Control Systems," by Bruns and Saunders, published by McGraw-Hill (pp. 188–193 relied on).